United States Patent [19]
Mazzucconi

[11] 3,936,111
[45] Feb. 3, 1976

[54] FURNITURE CONSTRUCTING KIT

[76] Inventor: Vittorio Mazzucconi, 22 Via Macchiavelli, Milan, Italy

[22] Filed: May 6, 1974

[21] Appl. No.: 466,868

[52] U.S. Cl........... 312/257 R; 211/148; 211/178 R; 403/173
[51] Int. Cl.² ...................... A47B 43/00; A47F 5/00
[58] Field of Search......... 108/111, 263; 312/257 R, 312/257 SK, 257 A, 263, 265, 111; 403/119, 217, 169–178, 231–235; 211/177, 178, 182

[56] References Cited
UNITED STATES PATENTS

| | | | |
|---|---|---|---|
| 9,805 | 7/1881 | Saint | 211/178 R |
| 961,982 | 6/1910 | Miller | 403/173 X |
| 3,670,899 | 6/1972 | Kronenberg et al. | 403/231 X |
| 3,747,965 | 7/1973 | Wing | 403/173 |
| 3,767,236 | 10/1973 | Horgan | 403/119 X |
| 3,835,354 | 9/1974 | Torres-Pena | 108/111 X |

FOREIGN PATENTS OR APPLICATIONS

| | | | |
|---|---|---|---|
| 719,968 | 12/1954 | United Kingdom | 211/178 R |
| 1,218,512 | 1/1971 | United Kingdom | 403/217 |
| 1,261,335 | 4/1960 | France | 403/234 |

*Primary Examiner*—Paul R. Gilliam
*Assistant Examiner*—Carl F. Pietruszka
*Attorney, Agent, or Firm*—Kurt Kelman

[57] ABSTRACT

A furniture construction kit comprising a few standard parts makes it possible to construct a variety of articles of furniture. The main parts are elongated frame elements each consisting of two coaxial tubes interconnected by diametrically opposed radial ribs, the inner tube having an internal thread at one end, and a joint associable with the end threads of the frame elements. The joint comprises two like rings fitting between the ends of two associated frame elements and a connecting member having a threaded shank for connection with the internal end thread for coaxial association the associated frame element and a sector-shaped hook head extending eccentrically from the shank in a plane perpendicular to the shank axis into one of the rings.

8 Claims, 18 Drawing Figures

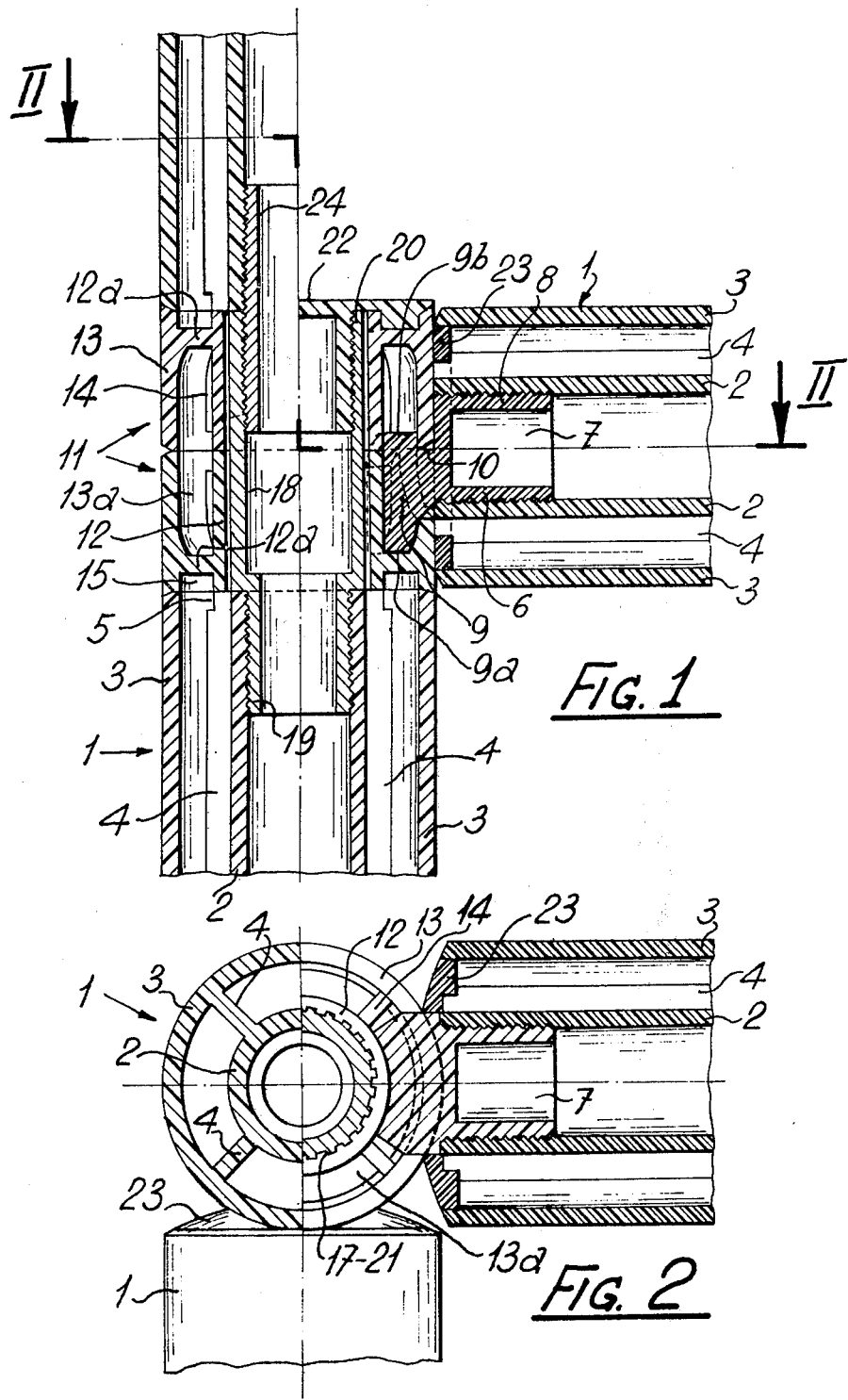

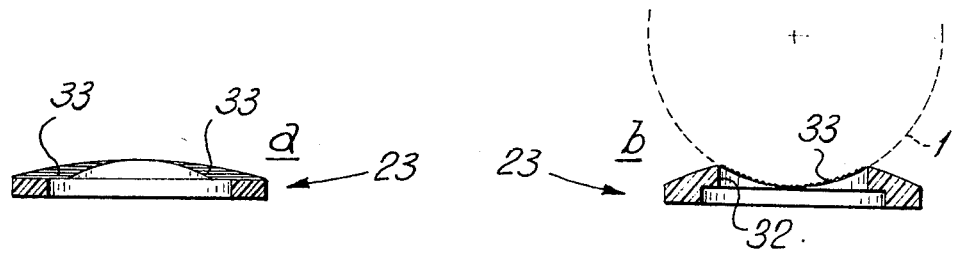
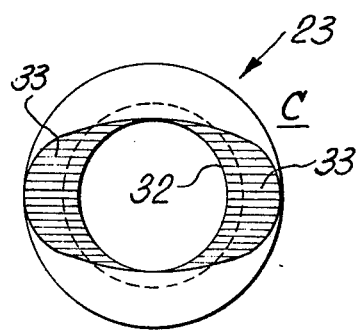
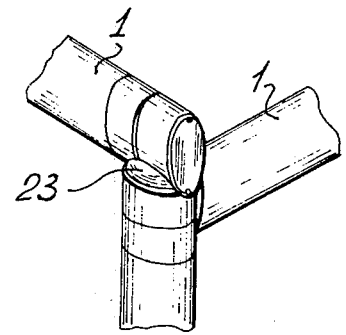
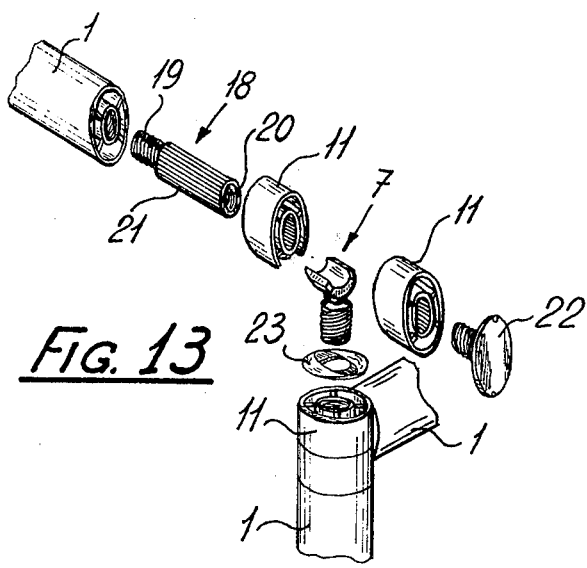
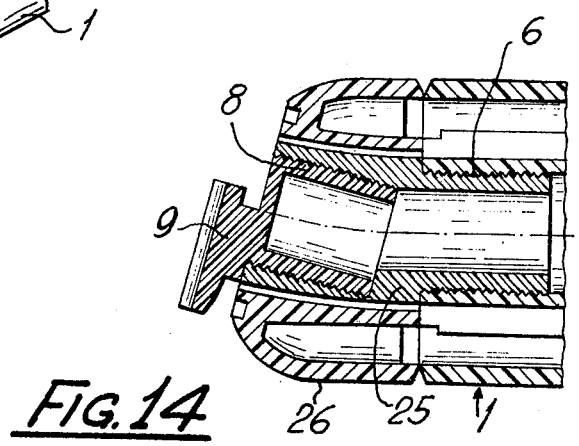

FURNITURE CONSTRUCTING KIT

The present invention relates to a construction kit for making furniture by the modular system and comprising standard parts including elongated frame elements and a joint associable therewith for forming a variety of junctions between the frame elements.

According to this invention, each frame element has an end and is comprised of an outer cylindrical tube and an inner cylindrical tube coaxial therewith, the inner cylindrical tube having an internal thread at the end. Axially continuous, diametrically opposed radial ribs interconnect the cylindrical tubes and adjacent ones of the radial ribs define axially extending spaced between the two cylindrical tubes. The frame elements may be straight or have straight and/or curved portions according to the desired shape of the furniture frame to be constructed.

The joint is associable with the threaded ends of the frame elements and comprises, according to one preferred embodiment, a ring means fitting between the ends of two of the frame elements and a connecting member having a threaded shank for threaded connection with the internal thread at the end of one frame element. The threaded shank is coaxially associable with the frame element and a sectorshaped hook head extends eccentrically from the shank in a plane perpendicular to the shank axis for engagement with the ring means. The hook head is constituted by a sector of a cylinder having an axis perpendicular to the shank axis and the axial length of the hook head cylinder is such that the hook head extends at one end beyond the periphery of the inner tube and at the other end beyond the axis of the inner tube.

The illustrated ring means consists of two like rings for coaxial association with the other one of the frame elements. Each ring has an axial length equal to the outer radius of the elements and comprises an outer cylindrical tube, an inner cylindrical tube coaxial therewith and axially continuous, diametrically opposed radial ribs interconnecting the outer and inner ring tubes, adjacent ones of the radial ribs of the rings defining axially extending spaces between the ring tubes. The outer cylindrical tube of at least one of the rings defines at least one aperture in communication with one of the spaces for receiving an associated connecting member shank and the sector-shaped hook head of the associated connecting member fits in the one space for hooking the one frame element to the one ring. An annular closure recessed from one end of the ring closes off one end of the spaces.

Preferably, the diameters of the inner and outer cylindrical tubes of the frame elements and the rings are equal, the inner surface of the cylindrical ring tube may be fluted and a connecting pin having two ends is provided. An external thread at one pin end is associable with the internal thread of a respective one of the frame elements and the pin has an internal thread at the other end.

Assembly is effected by screwing the threaded shank of the connecting member into the threaded end of one frame element inserting the hook head thereof into the aperture of a ring associated with the other frame element to produce a joint between the two frame elements.

In this manner, a part of a joint is formed which may be completed by an identical part mounted on the end of another tube. The two parts are assembled together so that the two rings are superimposed one upon the other co-axially, but in a mirror-reversed arrangement, the one hook, head end projecting into one ring and the other end into the other ring, thus providing a temporary connection and keeping the two rings together to form a joint. One ring may be rotated relatively to the other in order to arrange the two jointed frame elements in desired directions. A firm connection between both rings, to produce a stable joint, is obtained by means of a cylindrical pin provided with an external fluted profile meshing with the profile formed on the inner surface of the ring, and with threads on its ends to receive bolts or nuts to secure both rings axially. The pin may alternatively have a smooth central part, without flutes. It it is desired to form a junction between three tubes, one of which is perpendicular to the plane containing the other two already provided with rings and connected together, a fluted pin is inserted in the end of the third tube, by screwing, and then inserting the fluted profile in the two rings of the joint. In this manner it is also possible to connect four tubes together by locating two opposed tubes co-axially with a fluted pin and screwed to both ends of the pin, and locking both rings of the joint which connects the perpendicular tubes. It is also possible to form a joint with any number of co-axially superimposed rings, having a closed end of a ring to form a circular crown which permits insertion of the smaller portion of a hook for a temporary connection in rotation.

In addition to the possibility of connecting tubes at 90° to one another, intermediate parts may be provided as supports, with their ends inclined at any desired angle, and means for screwing the intermediate parts to the ends of tubes.

Shaped washers may be provided for the ends of the tubes where the supports are applied, to close the end of the tube and to act as locking washers for the rings forming the joint.

Reference is now made to the accompanying drawings, in which:

FIG. 1 is an axial section of a frame joint showing the ends of the elongated frame elements FIG. 2 is a partial section taken on the line II—II of FIG. 1;

FIGS. 12 and 13 show respectively the composition of a joint having superimposed frame elements in assembled and exploded views;

FIG. 14 shows an end support in an inclined section;

Figure 16:
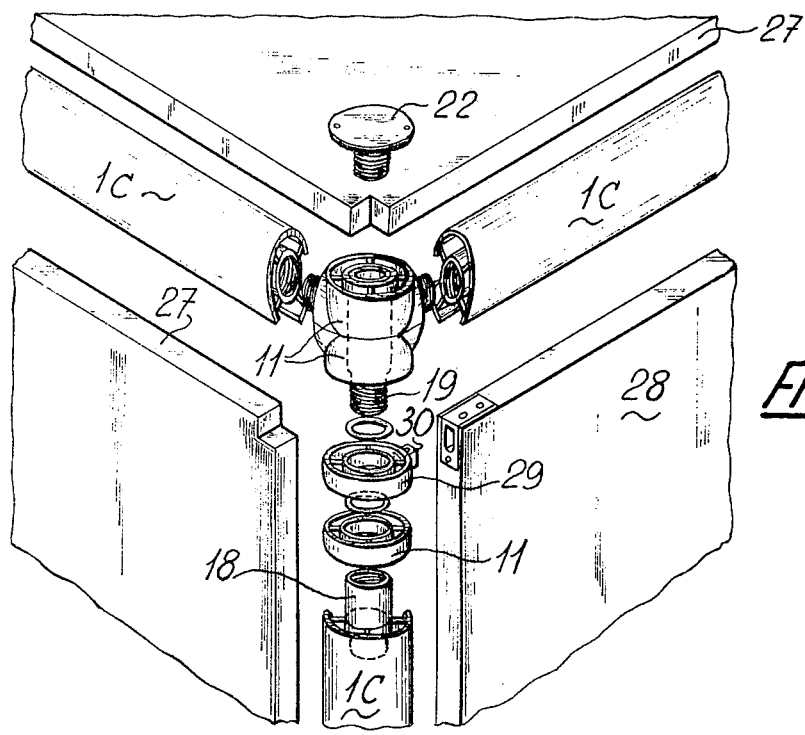
Figure 17:
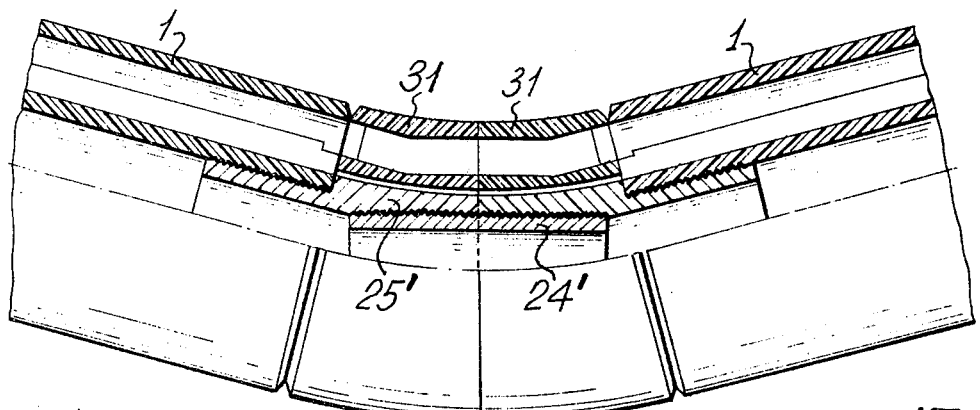

FIGS. 15a–e show five variants, in section, of a frame element for use with panels;

FIG. 16 shows an angular junction for the formation of a trihedron for a wardrobe, in an exploded view;

FIG. 17 shows an angled connection in part-section, of two portions of; and:

FIGS. 18a–c show a washer.

With reference to FIGS. 1 and 2, there is shown a corner of a frame which comprises two elongated annular elements 1, each formed from two coaxial cylindrical tubes 2 and 3 connected together by radial ribs 4, the tubular elements being at right angles to one another with their axes intersecting.

Figure 6:
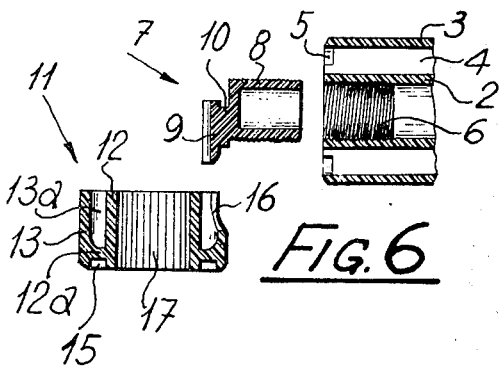
FIGS. 6 and 7 shows respectively the parts forming the joint, separately and assembled.

Ribs 4 have undercut ends, and the inner tube 2 is provided with a thread 6 (FIG. 6). Elements 1 may be straight or curved. Each frame element 1 may have its ribs undercut from the ends to a predetermined standard depth or multiples thereof, for forming frames for furniture of various types.

Figure 5:
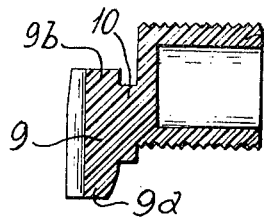
FIG. 5 shows the hook support in section taken on line V—V of FIG. 3.
Figures 3, 4:
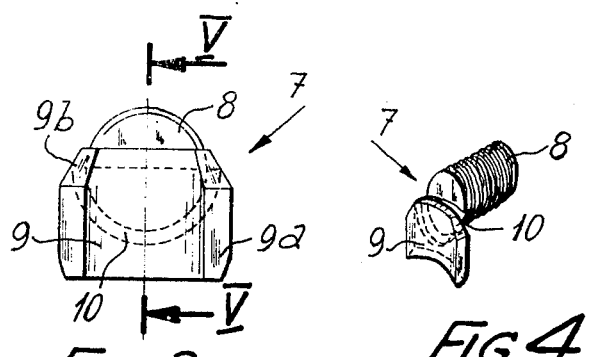
FIGS. 3 and 4 show respectively a front view and a perspective view of the hook support of the joint.

Elements 1 are joined by a convertible joint including connecting member 7, shown separately in FIGS. 3 and 4, with a threaded shank 8 and an eccentric hook 9 connected together by a short neck 10. The shank has a thread which is screwed into the corresponding thread 6 of the tube 2, in such manner as to enable the hook 9 to assume any one of a plurality of angular positions in a plane perpendicular to the axis of element 1. The thread may have 3 or 4 starts in order to obtain a variable angular arrangement of ⅓rd or ¼th of a turn.

The hook 9 has a sector-shaped head of an angular width equal to the angular distance between two adjacent ribs 4 of element 1 and of a thickness equal to the spacing between cylindrical tubes 2 and 3, the sector extending from the axis of the threaded shank 8 to one side by an amount 9a, which is a little less than the diameter of element 2 and on the other side by an amount 9b equal to undercut end 5 of the ribs 4 of the element 1.

Figure 7:
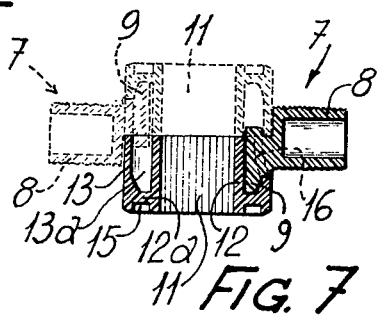

The hook 9 is connected to shank 8 by a short neck 10 extending from the middle of the shank 8 and equal in thickness to that of the tube 3. In FIGS. 1, 2 and 7, it will be noted that the hook can be inserted into ring 11.

The joint also comprises a pair of like shaped rings 11 each formed by two coaxial cylinders 12 and 13, closed at one end by annular crown 12a, and inter-connected by radial ribs 14 so as to present four spaces 13a, outer cylinder 13 having a semicircular portion 16 into which neck 10 fits.

The axial length of each ring 11 is equal to the outer radius of the element 1, and the crown 12a is spaced from the edge, forming notch 15 identical in dimension to notch 5 of the element 1. Channels 17 forming a fluted area are provided on the inner surface of ring cylinder 12.

The joint is formed by threadedly interconnecting shank 8 of support 7 with threaded end 6 of element 1, and by fitting a ring 11 so that its space 13a and portion 16 embrace the part 9a of hook 9 (FIGS. 1, 2, 6, 7). Since the ring 11 has four spaces 13a and shaped portions 16, this makes it possible to connect several elements 1 at an angle to one another. In this manner a joint element is formed which may be connected to an identical element in a mirror-reversed arrangement of which any one of the spaces 13a between the cylinders 12 and 13, or the notched portions 15, can receive hook 9.

The resiliency of the material permits this connection to be effected with a pressure or snap-like action, so that it is possible to rotate the two parts relatively to each other, or to make a temporary junction between them.

The joint can be locked in an angular portion and axially by means of a pin 18 having both ends 19, 20 threaded, one externally and one internally, so that the pin can be mounted on the end of the element 1. The central portion of the pin has an external channelled profile 21 identical to the internal channelled profile 17 of the ring 11. In order to complete the frame, a threaded plug 22 may be provided for threaded connection to inner threaded end 20, of ring 11 (FIGS. 10 and 13) and shaped washer 23 may form a closing plug for the end of one of the elements 1 (FIGS. 1, 13, 18) in the event of a connection established between elements having perpendicular axes.

Pin 24 is provided with an external screw thread for connection with two internal threads such as 6 and 20 between two axially aligned elements (FIG. 1).

Figure 8:
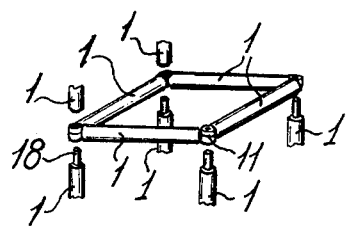
FIG. 8 shows the formation of a rectangular frame with four legs and two rods extending there from, for example for a chair.

FIG. 8 shows an assembly of a frame for a chair or the like, formed by four coplanar elements 1 connected at right angles by rings 11, and to other elements 1 forming the legs and the back of the chair, the leg and back elements being connected by pin 18 and pin 24, respectively.

Figure 10:
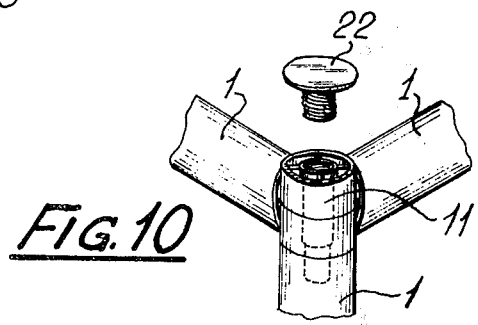
FIGS. 9 and 10 show a front jonit of the frame shown in FIG. 8, in partially assembled views.
Figure 9:
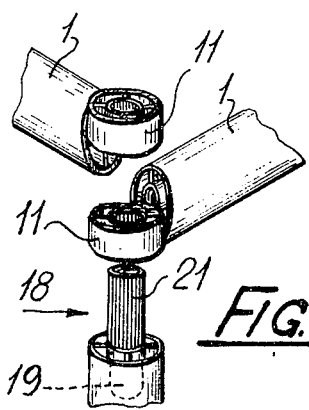
Figure 11:
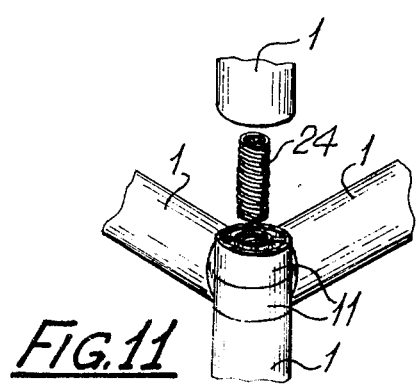
FIG. 11 shows the formation of the rear joint with the frame elements shown in FIG. 8.

FIGS. 9, 10 and 11 show respectively a front joint during assembly, FIG. 10 specifically showing a front joint while FIG. 11 illustrates the assembly of a rear joint.

FIGS. 12 and 13 show a junction with superimposed elements, in the assembled condition and in an exploded view, respectively.

FIG. 14 shows an end support including pin 25 having two threads with mutually inclined axes, one of which is adapted for screwing into the thread 6, the other for receiving the shank 8, 25 being covered by a sleeve 26 similar to the ring 11, but with a tilted end.

Figure 15:
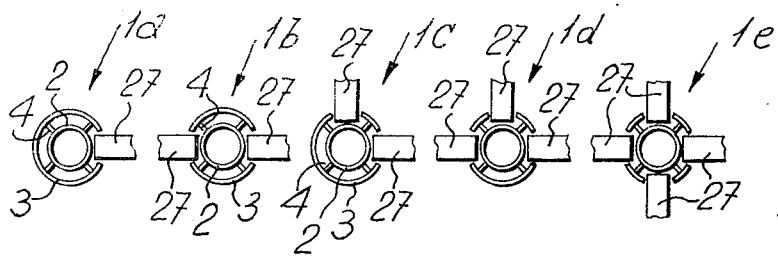

FIG. 15 shows five variants of frame element 1; in FIG. 15a a sector of the outer cylinder 3 is removed from element 1a to receive a panel 27, in FIGS. 15b and 15c two sectors are removed from element 1b and 1c for receiving two aligned and angularly displaced, panels 27 respectively and in FIGS. 15d and 15e, the element 1d and 1e is adapted to receive three or four panels 27, respectively.

FIG. 16 shows an exploded view of an angular junction for the formation of a trihedron for a closed item of furniture such as a cabinet, in which panels 27 are inserted in frame elements 1c, and a panel 28 forms a hinged door supported by a ring 29 provided with a hook 30, the ring 29 being rotatable on ring 11.

A pin 18 which axially connects the elements of the joint does not have teeth similar to the fluted profile 21, but has a smooth outer surface equal in diameter to the inner diameter of the ring 11, so that the ring itself, or other rings such as 29 carrying door panel 28, can rotate freely around its axis.

FIG. 17 shows pins 25' for joining two frame elements 1 at an angle.

The two pins are connected together by means of a threaded pin 24'.

Two rings 31 connect the outer surfaces of the frame elements 1.

FIGS. 18a–c are, respectively, a front view, a section and a plan of the shaped washer 23 shown in FIGS. 1, 2 and 13. The washer, of convex circular shape, is provided with an axial bore 32 to receive the shank 8, and with an arcuate cavity 33 with surface knurling, in which is inserted the outer surface of the ring 11 of the joint or that of the element 1. The knurled portion provides frictional engagement between the two parts.

It is possible, with the use of the parts described, to form articles of furniture such as bookcases, shelving or the like, having fixed or vertically adjustable shelves.

In such articles a hook support is inserted in one of the spaces existing between the co-axial tubes of the element 1 when the associated sector has been removed, as shown in FIG. 15. The hook 9 is inserted in the appropriate space and acts as a slider for displaceable shelves, and is locked in position by screwing the shank 8 in the end of the tube with the interposition of a washer 23 which, apart from forming the closure of the end of the tube, increases the locking friction with the knurled part 33.

In this way it is possible to connect ring joints side by side, as desired. It should also be understood that frame member 1 may be straight or formed with curves of various radii or other shape, the element being preferably made of plastic material. Any structural members, such as panels, linings, supporting surfaces, flexible surfaces and the like, may be connected to the frame of the present invention, and also numerous variants of construction or outer appearance may be made, without thereby departing from the scope of the appended claims.

I claim:

1. A furniture construction kit comprising
    1. at least two like elongated annular frame elements, each of the elements having an end and comprised of
        a. an outer cylindrical tube and an inner cylindrical tube coaxial therewith,
        b. the inner cylindrical tube having an internal thread at the end, and
        c. axially continuous, diametrically opposed radial ribs interconnecting the cylindrical tubes, adjacent ones of the radial ribs defining axially extending spaces between the two cylindrical tubes and
    2. a joint associable with the threads at the ends of the frame elements, the joint comprising
        a. a ring means fitting between the ends of two of the frame elements, the ring means being comprised of an outer cylindrical tube and an inner cylindrical tube coaxial therewith, the inner tube of the ring means defining a central bore, axially continuous, diametrically opposed radial ribs interconnecting the cylindrical tubes of the ring means, adjacent ones of the radial ribs defining axially extending spaces,
        b. a connecting pin having an externally threaded end for threaded connection with the internal thread at the end of one of the frame elements, the connecting pin fitting into the central bore of the ring means and being coaxially associable with the one frame element, and
        c. a connecting member having an externally threaded shank for threaded connection with the internal thread at the end of the other one of the frame elements, the threaded shank being coaxially associable with the other frame element, the connecting member having a sector-shaped hook head extending eccentrically from the shank in a plane perpendicular to the shank axis for engagement in a selected one of the axially extending spaces in the ring means, the selected space having an aperture for receiving the hook head.

2. The furniture construction kit of claim 1, wherein the ring means consists of two like rings for coaxial association with the one frame element, each ring having an axial length equal to the outer radius of the elements, and an annular closure recessed from one end of one ring and closing one end of the spaces.

3. The furniture construction kit of claim 2, wherein the connecting pin is in fluted engagement with the central bore of the ring means over at least a portion thereof and has an internally threaded and opposite to be externally threaded end thereof.

4. The furniture kit of claim 2, wherein the connecting pin is in fluted engagement with the central bore of one of the rings of the ring means while the central bore of the other ring is in smooth engagement with the adjacent periphery of the connecting pin to permit rotation between the pin and the other ring.

5. The furniture construction kit of claim 3, further comprising an end plug having a threaded shank for threaded engagement with the internal thread at the other pin end, and an annular flange for engagement in an annular recess produced by the end closure of the ring.

6. The furniture construction kit of claim 2, wherein the outer cylindrical tube of at least one of the frame elements defines an axially extending elongated slot, and further comprising a panel adapted to be received in the slot for attachment to the frame element.

7. The furniture construction kit of claim 6, further comprising a connecting pin having two ends, an external thread at one pin end for threaded engagement with the internal thread of the one frame element and at least a portion of the non-threaded periphery of the pin being smooth whereby at least one of the rings may be rotated on the pin, and a hook for supporting the panel on the rotatable ring whereby the pin and rotatable ring constitute a hinge for the panel operating as a door.

8. The furniture construction kit of claim 1, further comprising a shaped washer for closing the end of the other frame element, the radial ribs being undercut at the end to provide a seat for the washer, and the washer having a knurled arcuate portion for frictional coupling with an associated arcuate peripheral portion of the ring means.

* * * * *

UNITED STATES PATENT OFFICE
CERTIFICATE OF CORRECTION

PATENT NO. : 3,936,111
DATED : February 3, 1976
INVENTOR(S) : Vittorio Mazzucconi It is certified that error appears in the above–identified patent and that said Letters Patent are hereby corrected as shown below:

In the heading, between /21/ and /52/, insert:--

/30/ Foreign Application Priority Data
    May 11, 1973   Italy .................. 23976 A/73

Signed and Sealed this sixth Day of April 1976

[SEAL]

Attest:

RUTH C. MASON
*Attesting Officer*

C. MARSHALL DANN
*Commissioner of Patents and Trademarks*